US011501524B2

(12) United States Patent
Rogan et al.

(10) Patent No.: US 11,501,524 B2
(45) Date of Patent: Nov. 15, 2022

(54) GENERATING AUGMENTED REALITY IMAGES FOR DISPLAY ON A MOBILE DEVICE BASED ON GROUND TRUTH IMAGE RENDERING

(71) Applicant: Uber Technologies, Inc., San Francisco, CA (US)

(72) Inventors: Aaron Matthew Rogan, Westminster, CO (US); Taehun Yoon, Superior, CO (US); Gregory Mark Mahowald, Broomfield, CO (US)

(73) Assignee: Uber Technologies, Inc., San Francisco, CA (US)

( * ) Notice: Subject to any disclaimer, the term of this patent is extended or adjusted under 35 U.S.C. 154(b) by 408 days.

(21) Appl. No.: 16/712,821

(22) Filed: Dec. 12, 2019

(65) Prior Publication Data
US 2020/0232809 A1    Jul. 23, 2020

Related U.S. Application Data

(60) Provisional application No. 62/812,101, filed on Feb. 28, 2019, provisional application No. 62/812,098, (Continued)

(51) Int. Cl.
*G06V 20/56* (2022.01)
*H04L 67/52* (2022.01)
(Continued)

(52) U.S. Cl.
CPC ........... *G06V 20/00* (2022.01); *G01C 21/343* (2013.01); *G01C 21/3438* (2013.01);
(Continued)

(58) Field of Classification Search
CPC ...... G06V 20/00; G06V 20/20; G01C 21/343; G01C 21/3438; G01C 21/3644;
(Continued)

(56) References Cited

U.S. PATENT DOCUMENTS 8,483,715 B2    7/2013  Chen
8,806,653 B2    8/2014  Di Rienzo
(Continued)

FOREIGN PATENT DOCUMENTS

DE    102006034413 A1    1/2008
EP         2241858 A2    10/2010

OTHER PUBLICATIONS

European Patent Office, Extended European Search Report and Opinion, EP Patent Application No. 18854606.3, dated Apr. 23, 2021, ten pages.
(Continued)

*Primary Examiner* — Krishnan Ramesh
(74) *Attorney, Agent, or Firm* — Fenwick & West LLP

(57) ABSTRACT

Systems and methods are disclosed herein for monitoring a location of a client device associated with a transportation service and generating augmented reality images for display on the client device. The systems and methods use sensor data from the client device and a device localization process to monitor the location of the client device by comparing renderings of images captured by the client device to renderings of the vicinity of the pickup location. The systems and methods determine navigation instructions from the user's current location to the pickup location and select one or more augmented reality elements associated with the navigation instructions and/or landmarks along the route to the pickup location. The systems and methods instruct the client device to overlay the selected augmented reality elements on a video feed of the client device.

20 Claims, 6 Drawing Sheets

Related U.S. Application Data filed on Feb. 28, 2019, provisional application No. 62/812,107, filed on Feb. 28, 2019, provisional application No. 62/802,145, filed on Feb. 6, 2019, provisional application No. 62/801,012, filed on Feb. 4, 2019, provisional application No. 62/801,010, filed on Feb. 4, 2019, provisional application No. 62/795,988, filed on Jan. 23, 2019.

(51) Int. Cl.

| | | |
|---|---|---|
| *G06V 20/00* | (2022.01) | |
| *G06F 3/01* | (2006.01) | |
| *G06K 9/62* | (2022.01) | |
| *H04B 1/3827* | (2015.01) | |
| *H04W 4/029* | (2018.01) | |
| *G06F 16/587* | (2019.01) | |
| *G01C 21/34* | (2006.01) | |
| *G06Q 10/02* | (2012.01) | |
| *G06Q 10/04* | (2012.01) | |
| *G06Q 50/30* | (2012.01) | |
| *H04W 4/021* | (2018.01) | |
| *G01S 19/48* | (2010.01) | |
| *G06F 16/783* | (2019.01) | |
| *G01C 21/36* | (2006.01) | |
| *G06F 16/58* | (2019.01) | |
| *H04W 4/18* | (2009.01) | |
| *G06T 19/00* | (2011.01) | |
| *G06T 19/20* | (2011.01) | |
| *H04N 5/232* | (2006.01) | |
| *G06V 20/20* | (2022.01) | |
| *G06Q 30/02* | (2012.01) | |

(52) U.S. Cl.
CPC .......... *G01C 21/3644* (2013.01); *G01S 19/48* (2013.01); *G06F 3/016* (2013.01); *G06F 16/587* (2019.01); *G06F 16/5866* (2019.01); *G06F 16/7837* (2019.01); *G06K 9/6201* (2013.01); *G06K 9/6215* (2013.01); *G06Q 10/02* (2013.01); *G06Q 10/047* (2013.01); *G06Q 30/0209* (2013.01); *G06Q 30/0235* (2013.01); *G06Q 50/30* (2013.01); *G06T 19/006* (2013.01); *G06T 19/20* (2013.01); *G06V 20/20* (2022.01); *G06V 20/56* (2022.01); *H04B 1/3827* (2013.01); *H04L 67/52* (2022.05); *H04N 5/23222* (2013.01); *H04W 4/021* (2013.01); *H04W 4/029* (2018.02); *H04W 4/185* (2013.01); *G06T 2200/24* (2013.01); *G06T 2219/024* (2013.01)

(58) Field of Classification Search
CPC ..... G01C 21/3647; G01S 19/48; G06F 3/016; G06F 16/5866; G06F 16/587; G06F 16/7837; G06K 9/6201; G06K 9/6215; G06Q 10/02; G06Q 10/047; G06T 19/006; G06T 19/20; H04L 67/18; H04W 4/021; H04W 4/029; H04W 4/185
USPC .......................................................... 701/426
See application file for complete search history.

(56) References Cited

U.S. PATENT DOCUMENTS

| | | | |
|---|---|---|---|
| 9,894,484 B1* | 2/2018 | Pao | .................. H04W 4/029 |
| 10,573,020 B1 | 2/2020 | Sokolov et al. | |
| 10,643,104 B1 | 5/2020 | Xue et al. | |
| 10,834,523 B1 | 11/2020 | Rao | |
| 2010/0250113 A1 | 9/2010 | Miyata | |
| 2010/0250136 A1 | 9/2010 | Chen | |
| 2011/0313779 A1 | 12/2011 | Herzog et al. | |
| 2012/0176500 A1 | 7/2012 | Muto et al. | |
| 2013/0090090 A1 | 4/2013 | Rivere | |
| 2014/0100995 A1 | 4/2014 | Koshy et al. | |
| 2014/0172640 A1 | 6/2014 | Argue et al. | |
| 2015/0154851 A1 | 6/2015 | Vincent et al. | |
| 2015/0287108 A1 | 10/2015 | Monk | |
| 2016/0147826 A1 | 5/2016 | Mishra | |
| 2017/0059347 A1 | 3/2017 | Flier et al. | |
| 2017/0103571 A1 | 4/2017 | Beaurepaire | |
| 2017/0161958 A1* | 6/2017 | Eilat | .................. B60R 1/00 |
| 2017/0243403 A1 | 8/2017 | Daniels et al. | |
| 2017/0292313 A1 | 10/2017 | Herman et al. | |
| 2017/0343375 A1 | 11/2017 | Kamhi et al. | |
| 2017/0358147 A1 | 12/2017 | Brinig et al. | |
| 2018/0122024 A1 | 5/2018 | Carpenter et al. | |
| 2018/0136002 A1* | 5/2018 | Ishikawa | .............. B60W 50/00 |
| 2019/0017839 A1 | 1/2019 | Eyler et al. | |
| 2019/0063935 A1* | 2/2019 | Badalamenti | .......... G06T 11/60 |
| 2019/0072408 A1 | 3/2019 | Lee | |
| 2019/0164177 A1 | 5/2019 | Yeh et al. | |
| 2019/0204992 A1* | 7/2019 | Bowden | .............. G06F 3/04842 |
| 2019/0206029 A1* | 7/2019 | Koyama | ................ G06V 10/44 |
| 2019/0251719 A1* | 8/2019 | Wang | .................... H04W 4/026 |
| 2019/0289260 A1 | 9/2019 | Park et al. | |
| 2019/0384294 A1* | 12/2019 | Shashua | .............. G06V 20/584 |
| 2020/0068345 A1 | 2/2020 | Ondruska et al. | |
| 2020/0124427 A1 | 4/2020 | Kline et al. | |
| 2020/0164274 A1 | 5/2020 | Zhang | |
| 2020/0363216 A1 | 11/2020 | Elvanoglu | |
| 2021/0279969 A1 | 9/2021 | Cowburn et al. | |

OTHER PUBLICATIONS

United States Preinterview first office action, U.S. Appl. No. 16/712,902, dated Mar. 4, 2021, six pages.
United States First Action Interview Pre-Interview Communication, U.S. Appl. No. 16/712,883, dated Jul. 22, 2021, four pages.
United States First Action Interview Office Action, U.S. Appl. No. 16/712,883, dated Sep. 8, 2021, five pages.
United States Office Action, U.S. Appl. No. 16/712,824, dated Mar. 24, 2022, 13 pages.

* cited by examiner

GENERATING AUGMENTED REALITY IMAGES FOR DISPLAY ON A MOBILE DEVICE BASED ON GROUND TRUTH IMAGE RENDERING

CROSS REFERENCE TO RELATED APPLICATIONS

This application claims the benefit of U.S. Provisional Application No. 62/812,101, filed Feb. 28, 2019, U.S. Provisional Application No. 62/795,988, filed Jan. 23, 2019, U.S. Provisional Application No. 62/812,098, filed Feb. 28, 2019, U.S. Provisional Application No. 62/801,010, filed Feb. 4, 2019, U.S. Provisional Application No. 62/801,012, filed Feb. 4, 2019, U.S. Provisional Application No. 62/802,145, filed Feb. 6, 2019, U.S. Provisional Application No. 62/812,107, filed Feb. 28, 2019, which are incorporated by reference in their entirety.

TECHNICAL FIELD

The present disclosure relates to location determination with limited or no reliance on global positioning system (GPS) signals, and in particular to determining a location estimate for a client device and generating augmented reality images for display on the client device based on the determined location.

BACKGROUND

Many systems use global positioning system (GPS) coordinates to estimate the position of persons carrying client devices. For example, a person carrying a client device (referred to herein as a "rider" or a "user") may wish to arrange for transportation from his or her present location to another location, and may execute a transportation or ride-sharing application on his or her client device to obtain transportation from a transportation service provider (referred to herein as a "driver"). Existing systems in this scenario match a rider with a driver, and instruct the driver to travel to a location of the rider for pickup. However, the GPS coordinates used to estimate the position of the rider may be unknown or inaccurate due to interference or reception problems, such as those caused in geographic areas with tall buildings that distort satellite signals (referred to herein as "urban canyons"), for example. This erroneous GPS data may cause inconveniences for the driver when attempting to locate the rider for pickup. Similarly, this scenario may cause inconveniences for the rider while waiting for the driver to travel to the pickup location given the potentially inaccurate data and may cause the rider to consider alternate applications that offer transportation or rideshare services. Furthermore, it may be difficult for the rider to identify the selected pickup location, particularly in congested areas with heavy foot traffic, which may lead to inefficiencies in the pickup process, cause frustration to the parties, and delay the transportation service.

Existing systems seek to solve the technical problem of locating a rider by prompting riders to manually confirm their locations within the application. However, these systems can be cumbersome for riders that are unfamiliar with their surroundings or unsure of their exact locations. The technical problem of identifying an accurate current location of a rider and navigating the rider from his or her current location to the pickup location is not addressed by existing systems.

SUMMARY

Systems and methods are disclosed herein for determining a location of a user client device associated with a transportation service and generating for display on the client device augmented reality ("AR") elements navigating the user to a selected pickup location. To that end, a service (e.g., that connects a rider with a driver in the context of a transportation application) receives a request from a rider of the service for transportation to a destination location. In response to receiving the request, the service matches the requesting rider with one of a plurality of available drivers based in part on the respective locations of the rider and driver.

In one embodiment, the service determines the initial location of the rider based on global positioning system (GPS) data of the rider client device and generates navigation instructions from the initial rider location to the pickup location. One or more AR elements associated with the navigation instructions and/or pickup location are generated for display on the rider client device, and the service instructs the rider client device to initiate a video feed and overlay the one or more AR elements at locations on the video feed associated with the navigation instructions.

As the user navigates to the pickup location, the service uses a device localization process to further monitor the location of the user client device by comparing renderings of images captured by the rider client device to candidate images corresponding to the navigation instructions. In response to a rendering of a captured image matching at least one of the candidate locations, the service determines an updated rider location and generates additional navigation instructions and associated AR elements for display on the rider client device.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
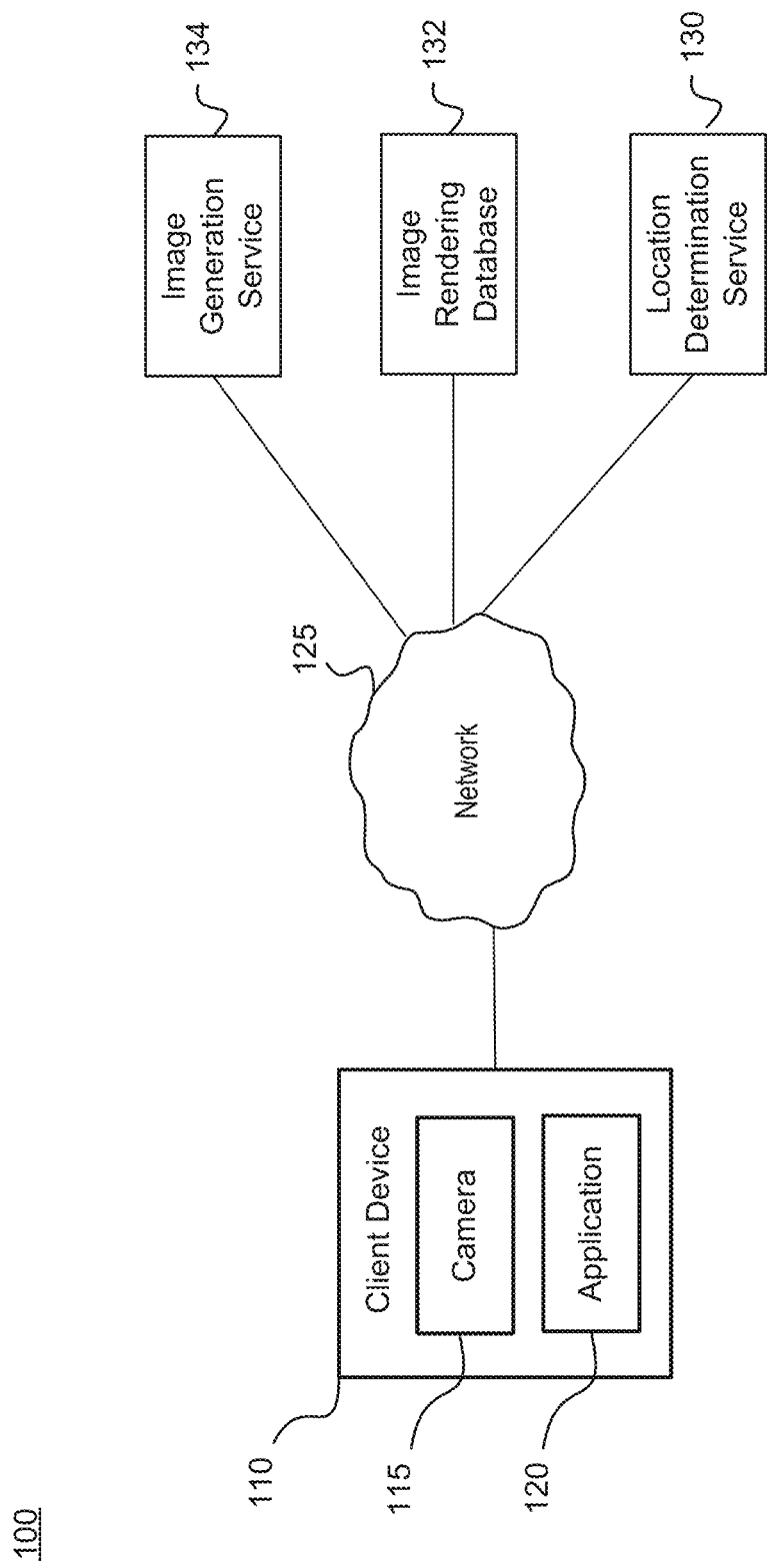
FIG. 1 is a block diagram illustrating an environment in which a transportation management system operates, according to one embodiment.

FIG. 1 is a block diagram illustration a location estimation system, according to one embodiment. System 100 includes client device 110 with camera 115. The functionality of client device 110 is described in further detail with respect to FIG. 6 below. Client device 110 executes an application 120, such as an application where a rider may request a ride from the rider's current location to a desired destination, and where the rider may be connected to a driver who also uses the application 120, where the driver will provide the ride. The application 120 may include a user interface that displays a map of the rider's current location as well as a pickup location within a threshold vicinity of the rider (e.g., as designated by the rider with a pin or other graphical user interface element/indicator). The application 120 may prompt the rider to navigate to the pickup location as discussed below with respect to FIGS. 3-5 so that the driver may locate and pick up the rider to perform the transportation service.

In an embodiment, client device 110 automatically captures one or more images using camera 115 based on commands received from the application 120. For example, client device 110 captures a frame upon a certain condition being satisfied (e.g., a certain distance has been traveled, or a certain amount of time has passed, from a last captured image). Times at which images are automatically captured by client device 110 will be described in further detail below with reference to FIGS. 3 and 5. Automatic capturing of one or more images may be an opt-in feature, where the application 120 by default does not automatically capture images using a camera of client device 110, and where the application 120 has a setting that, if selected by a user of client device 110, enables the application 120 to automatically capture the images. While accurate pinpointing of a rider's location using the systems and methods described herein may rely on opting in, the location of the rider may be determined based on GPS traces of client device 110 (even if inaccurate) should a user of client device 110 not opt-in to the automatic image capture described above.

In some embodiments, client device 110 transmits the image(s) to location determination service 130 over network 125, where location determination service 130 receives the image(s) and compares them to known images, stored in image rendering database 132, to determine the current location of client device 110. Location determination service 130 compares the determined current location to the pickup location selected for the transportation service and generates navigation instructions from the determined current location to the pickup location for display on client device 110. Navigation instructions are then provided by location determination service 130 to image generation service 134, which selects one or more augmented reality (AR) elements associated with the navigation instructions and/or the pickup location. In one embodiment, image generation service 134 instructs client device 110 to begin a video feed (e.g., through activation of camera 115) and instructs client device 110 to overlay the selected AR elements on the feed. Alternatively, image generation service 134 generates a composite image in which a base image of the current location of client device 110 is overlaid with the selected AR elements. As the rider navigates to the pickup location, location determination service 130 continues to monitor the location of client device 110 and provides location updates to image generation service 134 for generation of updated AR navigation instructions.

In some embodiments, the functionality of location determination service 130, image rendering database 132, and/or image generation service 134 is located within client device 110, and thus need not be accessed by network 125, as depicted. Functionality of location determination service 130 and/or image generation service 134 may be integrated as one or more modules of the application 120. Image rendering database 132 may be accessed by location determination service 130 directly, or over network 125. Location determination service 130 and/or image generation service 134 may be one or more modules of the application 120, or may be components of a ridesharing service generally. In some embodiments where location determination service 130 and/or image generation service 134 are modules of the application 120, some or all of the contents of image rendering database 132 are transmitted to the client device 110 for performing localization at the client device 110. The functionality of location determination service 130 and image generation service 134 will be described in further detail below with respect to FIGS. 3-5.

Identifying Regions Prone to Erroneous GPS Readings

Figure 2:
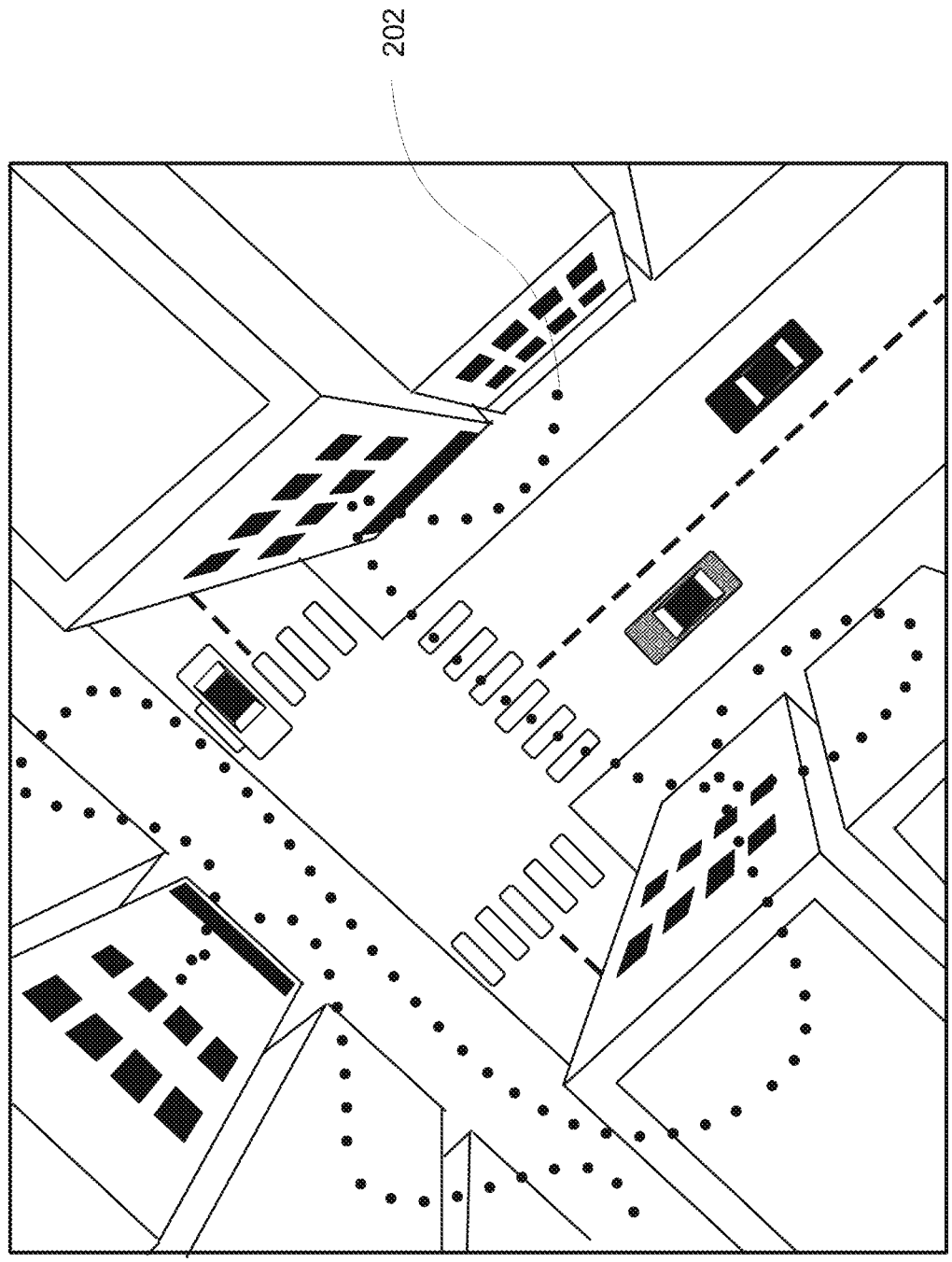
FIG. 2 is an illustration of GPS traces in a region where GPS signals are inaccurate according to one embodiment.

FIG. 2 is an illustration of GPS traces in a region where GPS signals are inaccurate according to one embodiment. Region 200 includes GPS traces 202 of a client device (e.g., client device 110) as derived from a GPS sensor of client device 110. As an illustrative example, the GPS traces 202 were derived from client devices that are on, or directly adjacent, to a road. Because of the existence of tall buildings within region 200, the GPS signals used to derive the GPS traces are distorted and provide inaccurate GPS traces. This is evidenced by the GPS traces being at locations that are not on, or directly adjacent to, a road.

Region 200 is exemplary of a location known to location determination service 130 to have or cause erroneous GPS data. The identification of various regions, like region 200, that are associated with erroneous GPS data may be performed automatically by location determination server 130, or may be made based on manual feedback. For example, location determination service 130 may detect that users of a ridesharing application 120 in a given location set a pickup pin at a location different from their GPS traces at a frequency that exceeds an implementer-defined threshold, and may determine therefrom that GPS data derived from client devices within that region are likely erroneous. As another example, location determination service 130 may detect that GPS traces of users (e.g., drivers) of a ridesharing application 120 are, at a frequency above a threshold, in areas inaccessible to drivers, such as within buildings or parks that do not have road access, and may determine therefrom that GPS data derived from client devices within that region are likely erroneous. As yet another example, location determination service 130 may receive feedback from users that their client devices are determining erroneous locations based on GPS sensors of those client devices, and may determine therefrom that GPS data derived from client devices within that region are likely erroneous.

Exemplary Display of Augmented Reality Elements on Rider Client Device

Figure 3:
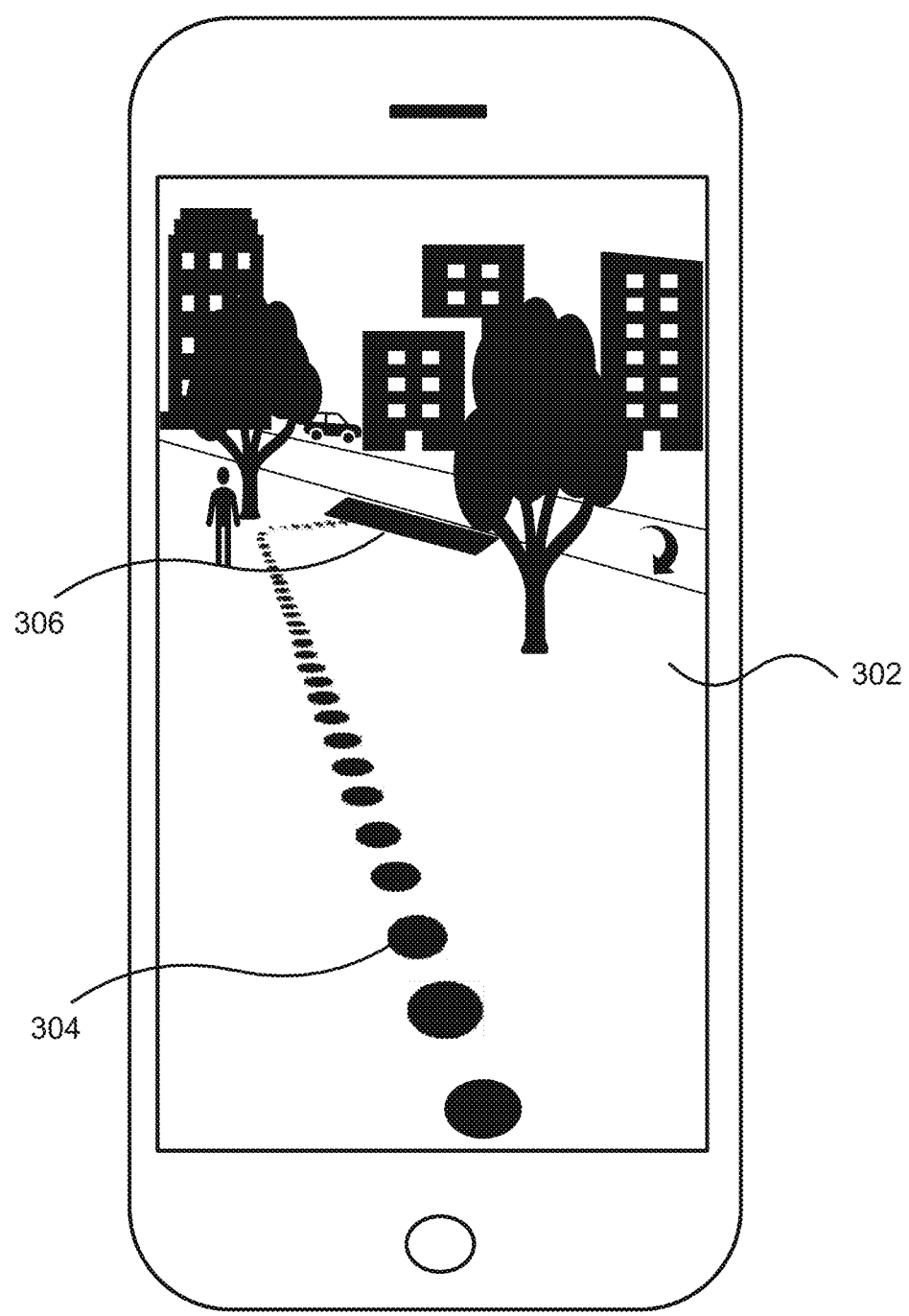
FIG. 3 is an illustration of an augmented reality image identifying a route to a pickup location, according to one embodiment.

FIG. 3 is an illustration of an example augmented reality image displayed on client device 110. In the embodiment shown in FIG. 3, a user has requested (e.g., using the above-described application 120) a transportation service to a destination location and a pickup location 306 has been designated as the starting point for the transportation service. In one embodiment, location determination service 130 selects a pickup location for the requesting user based at least in part on a comparison of the user's current location and current locations of a plurality of available drivers. Location determination service 130 then provides the selected pickup location for display on a user client device (such as client device 110). Alternatively, location determination service 130 selects one or more candidate pickup locations within a threshold distance of the current location of client device 110 and provides the candidate pickup locations as options for display on client device 110. In some embodiments, the aforementioned candidate pickup locations may be pickup locations that have historically been used frequently by other riders at or near the current location of client device 110, where such historically frequent pickup locations have been stored and are accessible by location determination service 130. In response to receiving a selection of a candidate pickup location from client device 110, location determination service 130 sets the selected location as the pickup location. In still other embodiments, location determination service 130 may detect that the requesting user has manually selected a pickup location (e.g., by moving and setting a pickup location "pin" or other graphical user interface element on a map displayed by the application 120) and may assign the associated location as the pickup location.

In response to receiving the service request, location determination service 130 matches the requesting user with one of a plurality of available drivers. In one embodiment, selection of an available driver is based in part on current locations of driver and rider client devices as determined automatically using global positioning system (GPS) data received from the driver and rider client devices. Location determination service 130 further provides an invitation message to the matched driver inviting the driver to fulfill the service request, and if the driver accepts via input to a driver client device, location determination service 130 assigns the selected driver to perform the transportation service.

In response to determining or receiving a selection of a pickup location for the transportation service, location determination service 130 triggers initialization of a virtual navigation process. In one embodiment, an initial location of client device 110 is determined based on GPS traces received from client device 110. Taking at least an initial GPS reading (even in a region like region 200), before determining location based on image renderings, enables location determination service 130 to determine the location of client device 110 by referencing far fewer entries of image rendering database 132 than would be necessary without knowledge of a general vicinity within which client device 110 is located. Alternatively, the initial location of client device 110 may be input by the rider through the application 120.

After determining or receiving an initial location of client device 110, location determination service 130 compares the location of client device 110 to the pickup location and generates navigation instructions to the pickup location. In embodiments where more than one possible route is determined from the rider's current location to the pickup location, location determination service 130 may query user of client device 110 (e.g., via a user interface display of client device 110) for selection of an available route. In one embodiment, the navigation instructions comprise a series of steps instructing the rider to navigate in specified directions to the pickup location. For example, a first navigation instruction might direct the rider to turn left in 10 meters, and a second navigation instruction might direct the rider to walk 20 meters down a sidewalk. Determination of a navigation instruction may be based on a line of sight of camera 115. For example, if a first portion of the route to the pickup location requires the rider to walk 50 meters along a sidewalk, but only 20 meters of the sidewalk are within a line of sight of camera 115, location determination service 130 generates a first navigation instruction directing the rider to walk 20 meters and generates a second navigation instruction directing the rider to walk 30 additional meters along the sidewalk in response to determining that the rider has reached an endpoint of the first navigation instruction. In this way, the navigation instructions provided to client device 110 can interact with the 3D geometry of the world captured in the displayed imagery.

Location determination service 130 sends a first navigation instruction to image generation service 134 and instructs image generation service 134 to select one or more AR elements for display on client device 110. In one embodiment, the selected AR elements are associated with the first navigation instruction. For example, the AR elements may include one or more of text (e.g., directing a rider to "Turn right in 10 meters" or "Continue walking straight") and graphical elements (e.g., a highlighted portion of a sidewalk, a flag, an arrow, etc.). Further, in some embodiments, the AR elements are non-visual. For example, AR elements may include audio navigation instructions, audio identification of the user's current location or the pickup location, and/or haptic signaling to orient client device 110 left or right. Additionally or alternatively, image generation service 134 selects one or more AR elements associated with the transportation service or the selected driver, such as text indicating an estimated time of arrival (ETA) of the rider and/or the driver to the pickup location, an identification of the driver and/or associated vehicle, and the like. The selected AR elements may be static or dynamic. For example, in conjunction with a navigation instruction directing a rider to turn left in 10 meters, image generation service 134 might select an undulating or flashing AR path and/or AR text that counts down the distance to the left turn as the rider navigates along the route. Additionally, if location determination service 130 determines (e.g., based on sensor data received from client device 110) that the orientation of client device 110 has changed since the selected AR element was provided for display, image generation service 134 determines an updated location of a landmark with which the AR is associated and instructs client device 110 to display the AR element at the updated location in the video feed. In this way, locations of selected AR elements on the display of client device 110 are dynamically adjusted based on the orientation of client device 110. In embodiments in which location determination service 130 determines that an initial line of sight of client device 110 is not on the route to the pickup location, image generation service 134 provides arrows or other AR elements instructing the user to aim client device 10 in the correct direction (e.g., by physically turning, tilting, or panning client device 110).

In one embodiment, in response to selecting one or more AR elements associated with the first navigation instruction, image generation service 134 instructs client device 110 to initiate a video feed using camera 115 and to begin displaying the captured feed on a display of client device 110. In one embodiment, the video feed is a real-time or near-real-time display of content captured by a sensor of camera 115. Alternatively, playback of the video feed on client device 110 is delayed by an offset amount of time from when it is captured (e.g., by 0.005 seconds). Client device 110 transmits the video feed to the image generation service 134, which analyzes the received feed by comparing pieces of the feed to stored visual indicators associated with the first navigation instruction. For example, if location determination service 130 has determined that the rider should walk approximately 20 meters along a sidewalk, image generation service 134 monitors the video feed for a visual indicator (e.g., the sidewalk) associated with the navigation instruction. Responsive to identifying the visual indicator in the video feed, image generation service 134 provides the one or more selected AR elements to the client device 110 and instructs client device 110 to overlay the AR elements onto the display of the video feed at locations associated with the identified visual indicators. In the example described above, for instance, image generation service 134 might instruct client device 110 to overlay a highlighted path on the sidewalk in the display of client device 110. In another example, a visual indicator may be to a landmark, such as a pole, a sign, a tree, and the like. Image rendering database 132 stores attributes of each landmark, such as a location, one or more renderings including the visual indicator, and/or a landmark type (e.g., stop sign, a storefront, etc.), and a mapping of each landmark to its associated visual indicator. Image generation service 134 queries image rendering database 132 for renderings of the visual indicators associated with the first navigation instruction so that image generation service 134 can identify the presence and location of one or more visual indicators in the video feed. Responsive to receiving the requested visual indicators from image rendering database 132, image generation service 134 compares portions of the video feed with the received renderings to identify one or more visual indicators in the feed. If image generation service 134 identifies one or more visual indicators in the feed, image generation service 134 instructs client device 110 to display an AR element on a portion of the feed at which the visual indicator of the landmark is located. The AR element may instruct the user to take an action upon reaching the landmark, such as "Turn right at the stop sign."

In one embodiment, the video feed augmented with one or more AR elements occupies the entire display of client device 110. Alternatively, the application 120 instructs client device 110 to display the video feed on a first portion of the user interface (e.g., a top half of the display) and other content (e.g., a map of a vicinity of client device 110, a user interface of the application 120, etc.) on a second portion of the user interface (e.g., a bottom half of the display).

In another embodiment, image generation service 134 generates a composite image for display on client device 110. The composite image may include an image of the location of client device 110 (the "base image") overlaid by the one or more selected AR elements. The base image may be selected by image generation service 134 based on a line of sight of camera 115 and/or based on a position and angle of client device 110 (e.g., as measured by an inertial measuring unit (IMU) of client device 110). In one embodiment, the base image is a frame captured by client device 110. Alternatively, image generation service 134 selects as the base image an image of the location of client device 110 retrieved from image rendering database 132.

Location determination service 130 continues to monitor the location of client device 110 as the rider travels along the determined route to the pickup location. In one embodiment, location determination service 130 instructs camera 115 to capture an image that will be used to determine the location of client device 110 without further use of a GPS sensor of client device 110. The application 120 causes client device 110 to transmit to location determination service 130 a rendering of the captured image. Location determination service 130 extracts geolocation data from the received rendering (i.e., location data such as latitude/longitude and/or an address stored as metadata associated with the rendering). For example, even if GPS data obtained by client device 110 is erroneous, it is likely to be within a threshold distance of the actual location of client device 110. Location determination service 130 then identifies a subset of entries of image rendering database 132 that correspond to the geolocation data (e.g., a subset of entries that correspond to a vicinity of the first navigation instruction). For example, location determination service 130 determines a radius of actual GPS coordinates that are within a threshold distance of a location indicted by the geolocation data. Location determination service 130 then compares the received rendering to candidate renderings of each entry in the subset of entries. For example, keypoints (i.e., spatial locations in the rendering that define areas of interest) of the received rendering may be extracted and compared to keypoints of the candidate renderings to determine whether a threshold amount of keypoints match. In some embodiments, in order to perform this determination, location determination service 130 determines that the received rendering does not completely match any candidate rendering of any entry of the subset of entries. For example, when comparing two-dimensional renderings, location determination service 130 may determine that not all keypoints of the received rendering match any candidate rendering. When comparing three-dimensional renderings, location determination service 130 may determine that the keypoints of the received rendering do not match all keypoints of any perspective of any candidate rendering.

Matching can be performed coarsely (e.g., as a first part of a process) by leveraging GPS to reduce the search space (e.g., to reduce the amount of database entries to be referenced, as discussed above and below). By using some large radius around a query/captured image GPS position, the application 120 isolates candidate renderings (e.g., images or 3D sections of the scene to match against). In some embodiments, the application 120 performs further filtering by using the heading direction of the query/captured image or 3D scene coordinates to align them to a "base map" that stitches together known renderings into a model of the world (e.g., a map of a 2D or 3D model of known renderings). Additional techniques like vocab trees, bag of words or even machine learning can be used to quickly retrieve a matching set of images or 3D content.

The process of determining whether a received rendering matches a candidate rendering is also referred to as a process of "alignment" herein. Alignment refers to aligning a received rendering of a captured image to either stored isolated renderings that have known corresponding locations, or to a portion of a base map, where each portion of the base map corresponds to a different location and is built from captured images of all locations that are informed by the base map. Location determination service 130 may perform 3D-3D alignment in a variety of ways. In some embodiments, location determination service 130 executes an iterative closest point (ICP) module to determine the 3D-3D alignment. Location determination service 130 may seed the 3D-3D alignment using machine-learned models that generate a segmentation by semantically segmenting the 3D scene of the base map. With that segmentation, location determination service 130 may determine a coarse alignment between similar semantic structures, such as car-to-car alignments, light post-to-light post alignments, and the like. With that coarse alignment, location determination service 130 may then revert to traditional ICP to perform the final precision alignment in an accelerated fashion.

In response to determining that the received rendering does not completely match any candidate rendering of any entry of the subset of entries, location determination service 130 determines that a percentage of characteristics of the received rendering match characteristics of the given entry of the subset of entries, and determines whether the percentage exceeds a threshold. In response to determining that the percentage exceeds the threshold, location determination service 130 determines that the received rendering matches the given entry of the subset of entries based on the partial match. Likewise, in response to determining that the percentage does not exceed the threshold, location determination service 130 determines that the received rendering does not match the given entry of the subset of entries notwithstanding the partial match.

In response to finding a matching rendering, location determination service 130 determines that the current location of client device 110 is a location indicated in the entry of image rendering database 132 that corresponds to the matching rendering. Location determination service 130 continues to monitor the location of client device 110 by instructing client device 110 to capture one or more frames upon a certain condition being satisfied (e.g., a certain distance has been traveled or a certain amount of time has passed from a reference point or since a previous location of client device 110 has been determined or since a previous image was captured by client device 110, an endpoint of a first navigation instruction has been reached, a direction of client device 110 has changed, etc.). Location determination service 130 may detect that the rider has traveled the predefined distance or has changed direction based on data from one or more of an accelerometer, a GPS sensor, or other sensors of the rider client device 110. In still other embodiments, the condition may be detecting that the rider has strayed from the determined route. For example, if a rider turns left, but a navigation instruction requires the rider to have turned right, location determination service 130 might instruct image generation service 134 to select AR elements instructing the rider to turn around. Alternatively, location determination service 130 might instruct client device 110 to display the video feed or a base image without any overlaid AR elements as a visual indication to the rider that the current direction is not on the route. Using augmented reality elements to navigate a rider to a pickup location is described further in U.S. patent application Ser. No. 15/693,317, filed on Aug. 31, 2017, which is hereby incorporated by reference in its entirety.

Image generation service 134 continues to select and provide for display AR elements associated with the navigation instructions, the transportation service, and/or the selected driver until location determination service 130 determines that the rider has reached the pickup location based on an image captured by camera 115 matching a rendering of the pickup location. For example, as shown in FIG. 3, an AR image includes an image 302 of the general vicinity of a pickup location and is overlaid by AR elements including a route 304 from the current location of client device 110 to the pickup location and an indication of the specific pickup location 306. In one embodiment, the image 302 of the pickup location is a video feed captured by camera 115, while in other embodiments, the image 302 is a base image of the pickup location retrieved from image rendering database 132. In the embodiment shown in FIG. 3, the pickup location 306 is indicated by a highlighted portion of the sidewalk. Additionally or alternatively, the AR elements include text and/or audio navigation instructions (e.g., "The pickup location is 5 meters ahead on the right.").

While the embodiment described above uses location determination service 130 to monitor and update a location of client device 110 as the user navigates to the pickup point, in other embodiments, image generation service 134 generates one or more AR navigation elements based on an approximate location of client device 110. For example, image generation service 134 may generate updated AR elements or an updated composite image responsive to sensor data from client device 110 indicating that the rider has walked in a particular direction for a specified period of time (e.g., 10 seconds) since previous AR elements were provided for display. In this way, updated AR elements or an updated composite image may be generated for display on client device 110 without determining the rider's precise location. Further, in some embodiments, an approximate or precise location of client device 110 is determined without use of location determination service 130. For example, the rider's location may be determined based on user input through the application 120 or using one or more onboard sensors of client device 110 (e.g., GPS, wi-fi fingerprinting, cell phone tower triangulation, etc.).

Further, while the described embodiment selects and provides for display AR images for a rider client device, in other embodiments, image generation service 134 selects mutual augmented reality elements for display on both rider and driver client devices. In one embodiment, if both a rider and a driver associated with a transportation service have consented to participating in a mutual AR experience, the application 120 selects one or more AR elements associated with the transportation service, the rider, and/or the driver and provides at least one selected AR element for display on each of the rider and driver client devices. Location determination service 130 may use received GPS data and/or other device localization to monitor a location of a driver client device associated with a driver assigned to the transportation service and may instruct image generation service 134 to select mutual AR elements associated with the pickup location and/or the transportation service for display to both the rider and the driver. For example, the AR elements might include an identification of the pickup location, the rider, or the driver, and/or icons allowing the rider and driver to initiate a conversation with each other, to share data (e.g., to make a payment), and/or to select additional AR elements to display on one or both of the devices. Providing a mutual augmented reality experience to riders and drivers is described further in U.S. patent application Ser. No. 16/197,243, filed Nov. 20, 2018, the disclosure of which is hereby incorporated by reference herein in its entirety.

Exemplary Use of Augmented Reality for Rider Queuing

Figure 4:
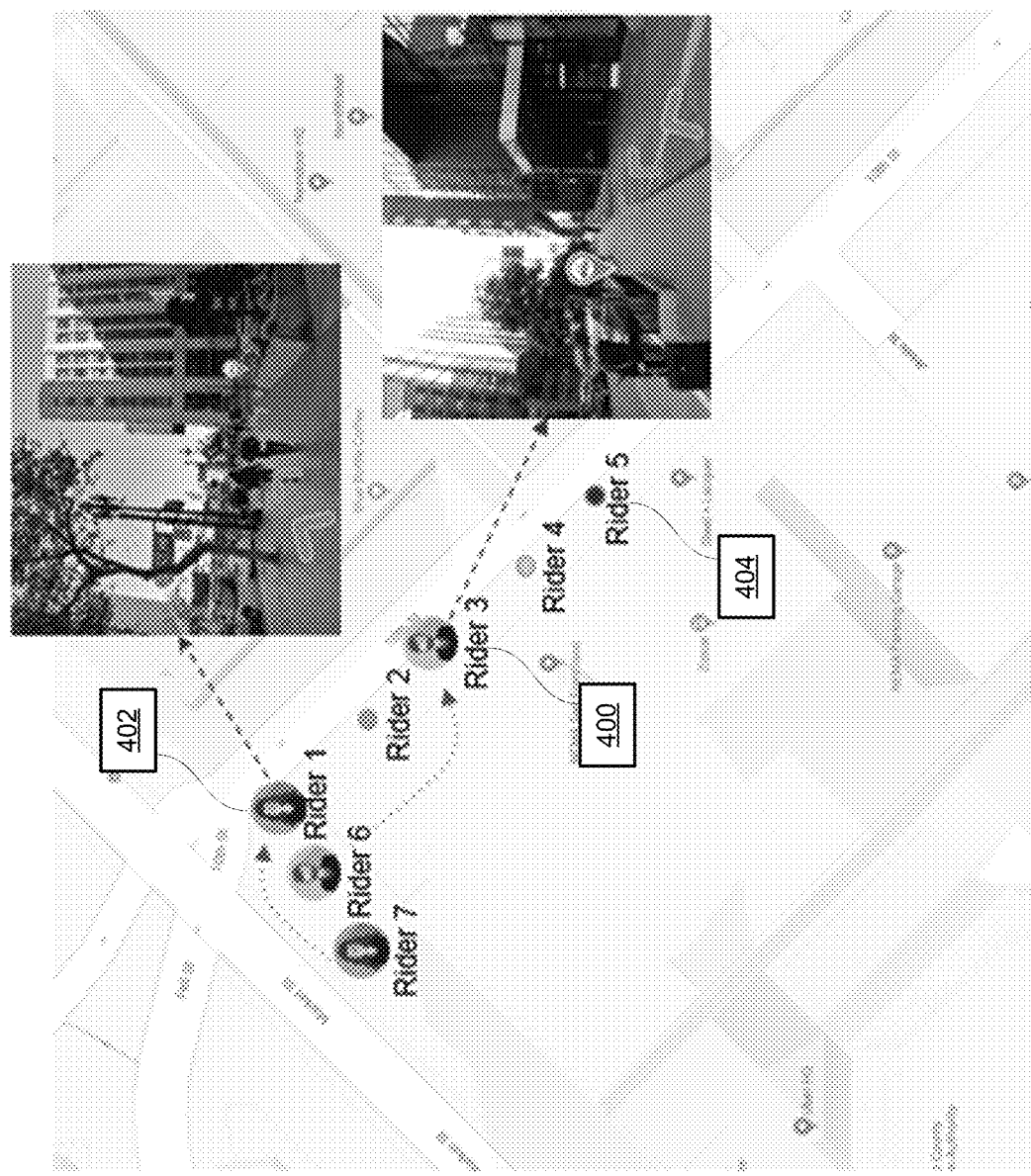
FIG. 4 is an illustration of a vicinity of pickup locations associated with a plurality of transportation services, according to one embodiment.

FIG. 4 is an illustration of a vicinity of pickup locations associated with a plurality of transportation services. For example, in a high-traffic area (such as an airport, a stadium, an office building, and the like), location determination service 130 might determine that multiple riders have requested transportation from the same vicinity and might select pickup locations within a threshold distance of each other (e.g., 100 meters apart). For example, as shown in FIG. 4, each of Riders 1-5 is directed to a different pickup location along a road.

In one embodiment, the same or a similar pickup location is associated with more than one requesting rider, such the application 120 uses AR image generation as a form of queuing for multiple transportation services. In instances where the requesting users are within a threshold distance of each other (e.g., all of the requesting users are within the same high-traffic area), location determination service 130 determines pickup locations for the requesting users based on the order in which the service request was received. In one embodiment, the pickup locations are predefined locations each associated with a landmark. For example, in FIG. 4, a first rider (labeled "Rider 1" in FIG. 4) submits the first request for transportation service of the displayed riders, and location determination service 310 selects a first pickup location corresponding to a first landmark (e.g., a sign, a pole, a tree or bush, and the like). Image generation service 134 may select one or more AR elements for display on a client device of Rider 1 to navigate Rider 1 to the first pickup location. Similarly, Rider 2 submits the second request for transportation service and is directed to a second pickup location associated with a second landmark, and so on.

In one embodiment, location determinations service 130 selects a predefined number of pickup locations in the high-threshold area such that, if location determination service 130 receives a request for transportation service after the predefined number of pickup locations have been assigned, location determination service 130 assigns the next requesting user to a position in a transportation service queue. If an occupied pickup location becomes vacant (e.g., location determination service 130 determines that the user previously assigned to the pickup location has been picked up by a driver), location determination service 130 determines the next request for service in the queue and assigns the requesting user to the vacant pickup location. For example, in the displayed embodiment, location determination service 130 designates five pickup locations for the high-traffic area, and the first five requesting users (Riders 1-5) are assigned and navigated to their respective pickup locations. If Rider 6 submits a request for transportation service, location determination service 130 determines that none of the designated pickup locations are available and assigns Rider 6 to a first position in the queue. Responsive to location determination service 130 determining that Rider 3 has vacated pickup location 400 location determination service 130 assigns Rider 6 to pickup location 400 and instructs image generation service 134 to provide for display one or more AR elements navigating Rider 6 to pickup location 400. Rider 7 may similarly be directed to a next available pickup location. For example, as shown in FIG. 4, Rider 7 is directed to pickup location 402 responsive to location determination service 130 determining that Rider 1 has vacated pickup location 402. In embodiments in which more than occupied pickup location is vacated within a threshold period of time, location determination service 130 routes a requesting user to a closest pickup location. For example, if both pickup location 402 and pickup location 404 become available within 5 seconds of each other, location determination service 130 assigns pickup location 402 to Rider 7.

In embodiments where image generation service 134 generates composite images comprising a base image overlaid by one or more AR elements, the same or similar base images may be used for display to multiple riders. For example, a first composite image might instruct Rider 3 to navigate to a pickup location 10 meters ahead. A second composite image displayed to Rider 4 might include the same base image as the first composite image, but augmented with AR elements instructing Rider 4 to navigate to a different pickup location 40 meters ahead.

Exemplary AR Image Generation for Display on Rider Device

Figure 5:
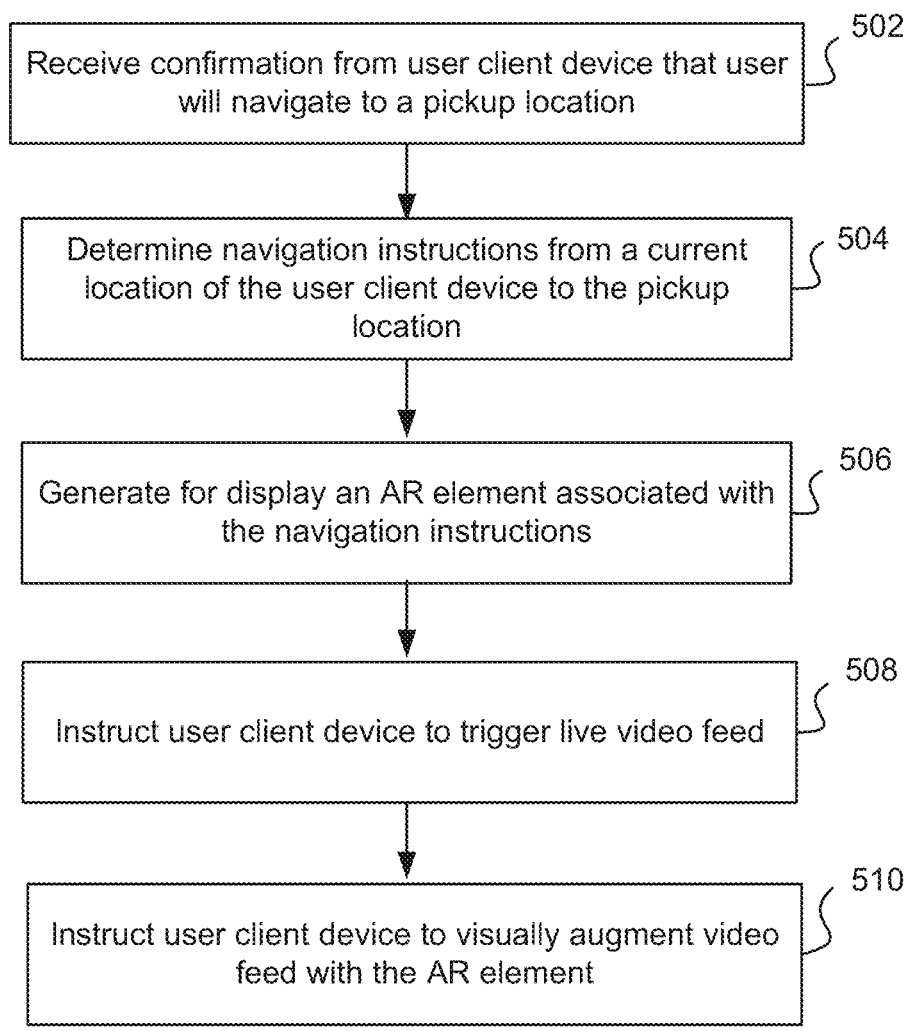
FIG. 5 is an illustrative flowchart of a process for generating augmented reality images for display on a client device based on ground truth image rendering, according to one embodiment.

FIG. 5 is an illustrative flowchart of a process for generating an AR image for display on a client device (e.g., client device 110), in accordance with some embodiments of the disclosure. A service, (e.g., a service that connects a rider with a driver in the context of a transportation application 120) receives a request for a ride from a client device 110. Upon receiving the request, location determination service 130 identifies a location of the requesting user and assigns a driver to service the service request based in part on a comparison of the user's location and the locations of a plurality of candidate drivers. Process 500 begins by the service receiving 502 a confirmation from client device 110 that the user will navigate to a pickup location associated with the service request. In one embodiment, location determination service 130 selects a driver for the transportation service by comparing an initial location of the client device 110, as determined based on GPS traces received from client device 110, to the current locations of a plurality of available drivers. Taking at least an initial GPS reading of client device 110 allows location determination service 130 to pair the user with a nearby driver and to determine subsequent locations of client device 110 by referencing fewer entries of image rendering database 132 than would be necessary without knowledge of the general vicinity in which client device 110 is located.

Location determination service 130 determines 504 navigation instructions from the current location of client device 110 to the selected pickup location. In one embodiment, the application 120 queries the user through client device 110 to allow the user to opt-in to navigation instructions. Alternatively, location determination service 130 automatically triggers generation of navigation instructions responsive to receiving confirmation from the user that the user will navigate to the selected pickup location.

Location determination service 130 instructs image generation service 134 to select 506 one or more AR elements for display on client device 110. In one embodiment, the AR elements are associated with the navigation instructions. For example, the selected AR elements may include text instructing the user to "Turn left in 10 meters," or "Turn right at the stop sign," and/or graphical elements such as arrows, flags, highlighting, and/or an AR depiction of the route (e.g., as shown in FIG. 3). Additionally or alternatively, the AR elements may be associated with other landmarks along the route, such as signs, poles, trees, and the like.

In one embodiment, image generation service 134 instructs 508 client device 110 to initiate a video feed using camera 115 and to begin displaying the captured feed on a display of client device 110. In one embodiment, a sensor of camera 115 captures the feed in real-time or near-real-time, while in other embodiments, playback of the video feed of client device 110 is delayed by an offset amount of time from capture. Image generation service 134 monitors the video feed for visual indicators of the navigation instructions and instructs 510 client device 110 to overlay the selected AR elements at positions in the video feed at which the visual indicators are located. For example, if the navigation instructions direct a rider to turn right at a stop sign, image generation service 134 instructs client device 110 to display an AR element, such as a highlighted box, on the portion of the video feed in which the stop sign is located.

As the user navigates to the pickup location, location determination service 130 continues to monitor the location of client device 110 and instructs image generation service 134 to select additional AR elements for display on client device 110 based on the current location of client device 110. The details of the device localization process are described above with respect to FIG. 3, the details of which apply fully hereto. For example, responsive to the occurrence of a condition (e.g., detecting that a threshold period of time has passed or that client device 110 has traveled a threshold distance since determination of a previous navigation instruction, detecting that client device 110 has reached an end point of a previous navigation instruction, etc.), location determination service 130 instructs client device 110 to capture at least one image using camera 115 and compares a rendering of the captured image with a subset of entries of image rendering database 132. In response to finding a rendering matching the rendering of the captured image, location determination service 130 determines an updated location of client device 110 at a location indicated in the entry that includes the matching rendering. In some embodiments, location determination service 130 generates an updated navigation instruction in response to determining the updated location of client device 110. For example, if location determination service 130 determines that the rider has strayed from the calculated route, location determination service 130 generates a navigation instruction that will return the rider to the route. In one embodiment, location determination service 130 instructs image generation service 134 to select and provide for display one or more AR elements associated with the updated navigation instruction (e.g., text instructing the rider to "Turn around."). Alternatively, location determination service 130 instructs image generation service 134 not to provide for display any AR elements as a visual indication to the rider that the current direction is not on the route.

In one embodiment, location determination service 130 compares the current location of client device 110 to the pickup location to determine whether client device 110 is within a threshold distance of the pickup location. Renderings of images captured by client device 110 are compared to a plurality of candidate images corresponding to the pickup location. If location determination service 130 determines that a captured rendering matches at least one candidate image, location determination service 130 determines that the location of client device 110 is the location associated with the matching rendering and that client device 110 is within a threshold distance of the pickup location. In response to determining that client device 110 is within a threshold distance of the pickup location, location determination service 130 instructs image generation service 134 to select one or more AR elements associated with the pickup location, such as a sign, an arrow, a highlighted portion of the sidewalk (as shown in FIG. 3), and the like.

Additionally, in some embodiments, the application 120 selects mutual AR content for display on client devices of both the rider and the driver. Location determination service 130 may similarly use the device localization process described above to monitor a location of a driver client device, such as a client device located in a vehicle that the driver will use to provide the requested transportation service. If both the rider and the driver have opted-in to sharing their locations and participating in a mutual AR session, location determination service 130 compares current locations of the rider and driver client devices as the rider and driver navigate to the pickup location. In response to determining that the rider and driver client devices are within a threshold distance of each other, location determination service 130 triggers a mutual AR session and instructs image generation service 134 to select one or more AR elements for display on the rider and driver client devices. For example, AR elements selected for display on both rider and driver client devices may include an indication of the pickup location and/or icons allowing the rider and the driver to initiate a conversation with each other, to share data, and/or to select additional AR elements to display on one or both devices. Additionally, AR elements selected for display on the rider client device may include an identification of the driver's vehicle, and AR elements selected for display on the driver client device may include an identifier of the rider and/or the rider client device. In one embodiment, image generation service 134 selects the same or similar AR elements for display on both devices, such as selectable icons that allow the rider and driver to initiate a conversation with each other. Additionally or alternatively, image generation service 134 selects different AR elements for each of the rider and driver client devices. For example, AR elements selected for display on the rider client device might include an identification of the driver's vehicle, while AR elements selected for display on the driver client device might include an identification of the pickup location.

In some embodiments, triggering display of the mutual AR elements on the driver client device may be based on determining that a vehicle in which the driver client device is located has been stopped for at least a threshold period of time (e.g., based on data obtained from an accelerometer of the driver client device). The threshold period of time may be greater than a time period during which the vehicle might be stopped at a stop sign or a result of sudden braking such that determining that the vehicle has been stopped for at least the threshold period of time indicates that the vehicle is likely stopped at a traffic signal, at the pickup location, or has otherwise pulled over and can safely view the video feed and selected AR elements. In another embodiment, if location determination service 130 detects renewed movement of the driver client device (and thus, the vehicle) prior to the driver confirming through the driver client device that the requested service has started, location determination service 130 instructs the driver client device to cease display of the video feed. Responsive to detecting a next stop of the vehicle for over the threshold period of time, location determination service 130 to resume display of the video feed. In still another embodiment, display of the video feed is based on user input through the driver client device. For example, the driver might request, through the application 120, an AR option for identifying the rider associated with the service request.

Computing Hardware

Figure 6:
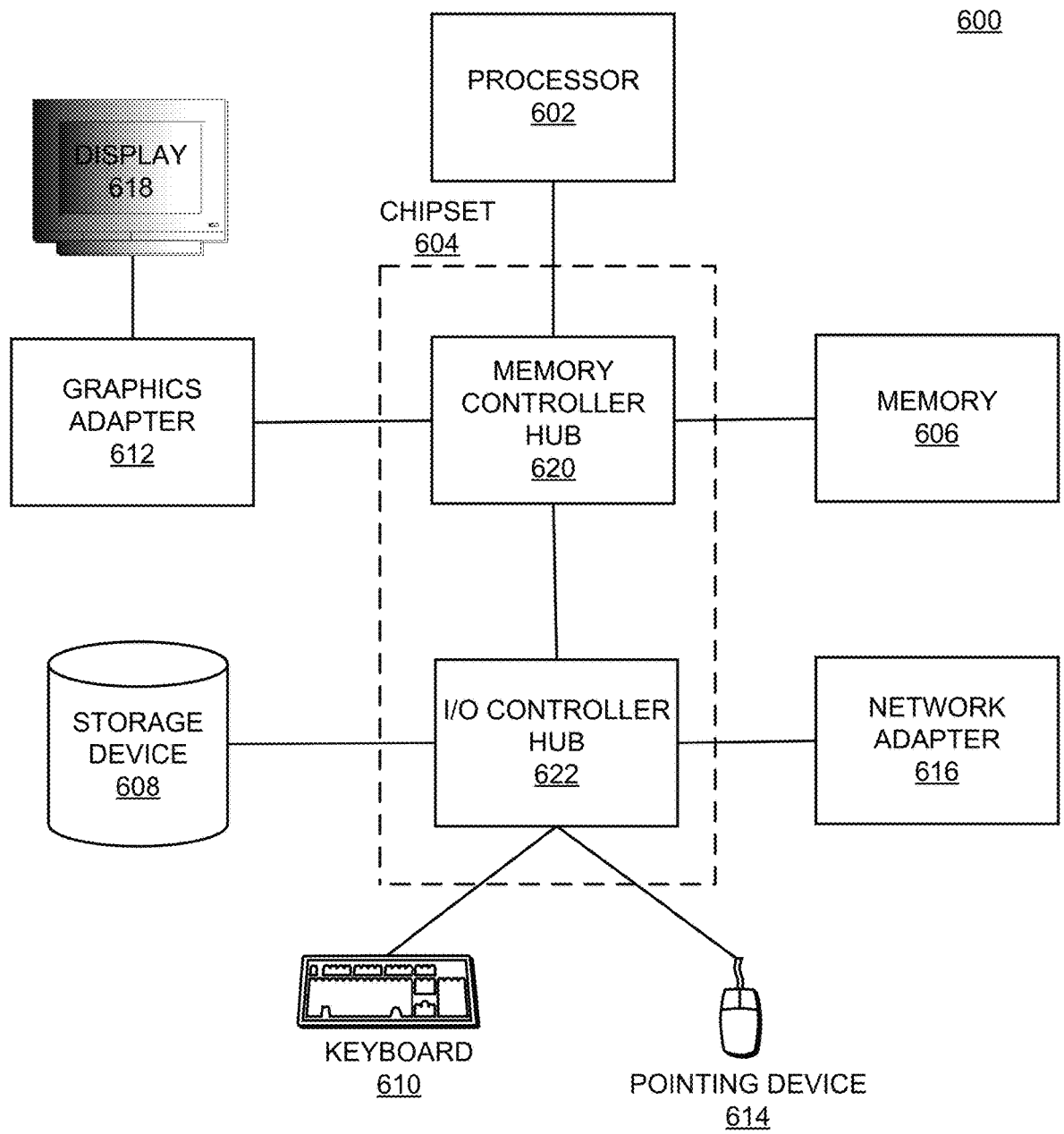
FIG. 6 is a block diagram that illustrates a computer system, according to one embodiment.

The entities shown in FIG. 1 are implemented using one or more computers. FIG. 6 is a block diagram that illustrates a computer system 600 for acting as a client 110 or location determination service 130, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 125.

As is known in the art, a computer 600 can have different and/or other components than those shown in FIG. 6. In addition, the computer 600 can lack certain illustrated components. For example, the computer acting as the location determination service 130 can be formed of multiple blade servers linked together into one or more distributed systems and lack components such as keyboards and displays. More-over, the storage device 608 can be local and/or remote from the computer 600 (such as embodied within a storage area network (SAN)).

Additional Considerations

The foregoing description described one embodiment of the invention in which a central server including location determination service 130, image rendering database 132, and image generation service 134 monitors the location of a client device (such as client device 110) and selects at least one AR image for display on the client device. In other embodiments, some or all of the functions described from the perspective of the central server are performed on the client device. For example, location determination service may be a module installed in a transportation application 120 executing on the client device. Further, while the embodiment described herein uses location determination service 132 to monitor the location of client device 110 in instances where GPS data is erroneous, device localization may be used regardless of GPS quality (e.g., regardless of whether the rider is traveling through an urban canyon). Still further, while the described embodiment describes a transportation service provider as a driver of a vehicle, in other embodiments, the transportation service provider is an autonomous vehicle that transports the rider to the destination location.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A computer-implemented method for generating augmented reality elements associated with a transportation service, the method comprising:
   receiving a request from a client device of a user for navigation instructions to navigate to a pickup location associated with the transportation service;
   in response to receiving the request, instructing the client device to capture an image;
   determining a current location of the client device based on a comparison between a rendering of the captured image and a plurality of entries in a database of renderings, each respective entry including a respective rendering and a respective associated location;
   generating navigation instructions from the current location of the client device to the pickup location;
   generating for display an augmented reality element associated with the navigation instructions; and
   instructing the client device to visually augment a video feed being captured by a camera of the client device with the augmented reality element.

2. The method of claim 1, wherein determining the current location comprises:
   determining, based on the comparing, that the captured image matches at least one of the respective renderings included in the entries; and
   determining the current location of the client device to be the location associated with the matching rendering.

3. The method of claim 2, further comprising:
   extracting geolocation data from the rendering of the captured image;
   determining a subset of the entries corresponding to the geolocation data; and
   limiting the comparing of the rendering of the captured image to the subset of the entries.

4. The method of claim 2, further comprising:
   monitoring a location of a client device of a driver navigating to the pickup location;
   comparing the locations of the client device of the user and the client device of the driver; and
   responsive to determining that the client device of the user and the client device of the driver are within a threshold distance of each other, instructing the client device of the user and the client device of the driver to display mutual augmented reality elements associated with a transportation service.

5. The method of claim 1, wherein generating for display an augmented reality element associated with the navigation instructions comprises:

identifying, in the video feed, a visual indicator of a landmark;
generating an augmented reality element identifying the visual indicator; and
instructing the client device to place the augmented reality element identifying the visual indicator on a portion of the video feed where the visual indicator is located.

6. The method of claim 1, wherein generating for display an augmented reality element associated with the navigation instructions comprises:
identifying, in the video feed, a visual indicator of the pickup location;
generating an augmented reality element identifying the visual indicator; and
instructing the client device to place the augmented reality element identifying the visual indicator on a portion of the video feed where the visual indicator is located.

7. The method of claim 1, wherein instructing the client device to visually augment the video feed with the augmented reality element comprises:
determining that a landmark associated with the navigation instructions is within a line of sight of a camera of the client device; and
generating for display an augmented reality element identifying the landmark and instructing a user of the client device to perform an action upon reaching the landmark.

8. The method of claim 1, further comprising:
designating a specified number pickup locations for transportation service, the pickup locations associated with landmarks located within a threshold distance of each other;
receiving a plurality of requests for transportation service from a plurality of client devices having current locations within a threshold distance of the pickup locations;
determining that the plurality of requests exceeds the specified number of pickup locations; and
assigning the requests to the pickup locations in an order in which the requests were received, wherein a first number of requests corresponding to the number of pickup locations are assigned to each respective pickup location and wherein a second number of requests are placed in a transportation request queue.

9. The method of claim 8, further comprising:
determining that an occupied pickup location has been vacated;
determining a next request in the transportation request queue; and
assigning the next request to the vacated pickup location.

10. A non-transitory computer-readable storage medium storing computer program instructions executable by a processor to perform operations comprising:
receiving a request from a client device of a user for navigation instructions to navigate to a pickup location associated with the transportation service;
in response to receiving the request, instructing the client device to capture an image;
determining a current location of the client device based on a comparison between a rendering of the captured image and a plurality of entries in a database of renderings, each respective entry including a respective rendering and a respective associated location;
generating navigation instructions from the current location of the client device to the pickup location;
generating for display an augmented reality element associated with the navigation instructions; and
instructing the client device to visually augment a video feed being captured by a camera of the client device with the augmented reality element.

11. The non-transitory computer-readable storage medium of claim 10, wherein determining the current location comprises:
determining, based on the comparing, that the captured image matches at least one of the respective renderings included in the entries; and
determining the current location of the client device to be the location associated with the matching rendering.

12. The non-transitory computer-readable storage medium of claim 11, wherein the operations further comprise:
extracting geolocation data from the rendering of the captured image;
determining a subset of the entries corresponding to the geolocation data; and
limiting the comparing of the rendering of the captured image to the subset of the entries.

13. The non-transitory computer-readable storage medium of claim 11, wherein the operations further comprise:
monitoring a location of a client device of a driver navigating to the pickup location;
comparing the locations of the client device of the user and the client device of the driver; and
responsive to determining that the client device of the user and the client device of the driver are within a threshold distance of each other, instructing the client device of the user and the client device of the driver to display mutual augmented reality elements associated with a transportation service.

14. The non-transitory computer-readable storage medium of claim 10, wherein generating for display an augmented reality element associated with the navigation instructions comprises:
identifying, in the video feed, a visual indicator of a landmark;
generating an augmented reality element identifying the visual indicator; and
instructing the client device to place the augmented reality element identifying the visual indicator on a portion of the video feed where the visual indicator is located.

15. The non-transitory computer-readable storage medium of claim 10, wherein generating for display an augmented reality element associated with the navigation instructions comprises:
identifying, in the video feed, a visual indicator of the pickup location;
generating an augmented reality element identifying the visual indicator; and
instructing the client device to place the augmented reality element identifying the visual indicator on a portion of the video feed where the visual indicator is located.

16. The non-transitory computer-readable storage medium of claim 10 wherein instructing the client device to visually augment the video feed with the augmented reality element comprises:
determining that a landmark associated with the navigation instructions is within a line of sight of a camera of the client device; and
generating for display an augmented reality element identifying the landmark and instructing a user of the client device to perform an action upon reaching the landmark.

17. A system comprising:
a processor for executing computer program instructions; and
a non-transitory computer-readable storage medium storing computer program instructions executable by the processor to perform operations for estimating a location of a client device, the operations comprising:
receiving a request from a client device of a user for navigation instructions to navigate to a pickup location associated with the transportation service;
in response to receiving the request, instructing the client device to capture an image;
determining a current location of the client device based on a comparison between a rendering of the captured image and a plurality of entries in a database of renderings, each respective entry including a respective rendering and a respective associated location;
generating navigation instructions from the current location of the client device to the pickup location;
generating for display an augmented reality element associated with the navigation instructions; and
instructing the client device to visually augment a video feed being captured by a camera of the client device with the augmented reality element.

18. The system of claim 17, wherein determining the current location comprises:
determining, based on the comparing, that the captured image matches at least one of the candidate images; and
determining the current location of the client device to be the location associated with the matching rendering.

19. The system of claim 18, wherein the operations further comprise:
monitoring a location of a client device of a driver navigating to the pickup location;
comparing the locations of the client device of the user and the client device of the driver; and
responsive to determining that the client device of the user and the client device of the driver are within a threshold distance of each other, instructing the client device of the user and the client device of the driver to display mutual augmented reality elements associated with a transportation service.

20. The system of claim 17, wherein generating for display an augmented reality element associated with the navigation instructions comprises:
identifying, in the video feed, a visual indicator of a landmark;
generating an augmented reality element identifying the visual indicator; and
instructing the client device to place the augmented reality element identifying the visual indicator on a portion of the video feed where the visual indicator is located.

* * * * *

UNITED STATES PATENT AND TRADEMARK OFFICE
CERTIFICATE OF CORRECTION

PATENT NO. : 11,501,524 B2
APPLICATION NO. : 16/712821
DATED : November 15, 2022
INVENTOR(S) : Rogan et al.

Page 1 of 1

It is certified that error appears in the above-identified patent and that said Letters Patent is hereby corrected as shown below:

In the Claims

In Column 17, in Claim 8, Line 29, delete "number pickup" and insert -- number of pickup --, therefor.

Signed and Sealed this
Fourth Day of April, 2023

Katherine Kelly Vidal
Director of the United States Patent and Trademark Office